US011475684B1

(12) United States Patent
Deng et al.

(10) Patent No.: US 11,475,684 B1
(45) Date of Patent: Oct. 18, 2022

(54) METHODS AND SYSTEMS FOR PERFORMING NOISE-RESISTANT COMPUTER VISION TECHNIQUES

(71) Applicant: Amazon Technologies, Inc., Seattle, WA (US)

(72) Inventors: Siqi Deng, Kirkland, WA (US); Yuanjun Xiong, Seattle, WA (US); Wei Li, Seattle, WA (US); Shuo Yang, Seattle, WA (US); Wei Xia, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 16/830,148

(22) Filed: Mar. 25, 2020

(51) Int. Cl.
*G06V 30/32* (2022.01)
*G06N 3/08* (2006.01)
*G06N 3/04* (2006.01)

(52) U.S. Cl.
CPC ............. *G06V 30/36* (2022.01); *G06N 3/04* (2013.01); *G06N 3/08* (2013.01)

(58) Field of Classification Search
CPC ............ G06N 3/04; G06N 3/08; G06V 40/16; G06V 40/168; G06V 40/172; G06V 30/36
See application file for complete search history.

(56) References Cited

U.S. PATENT DOCUMENTS

| 2008/0181508 | A1* | 7/2008 | Kaneda ............... G06V 40/175 382/190 |
| 2010/0172579 | A1* | 7/2010 | Reid .................... G06V 40/161 382/199 |
| 2018/0032796 | A1* | 2/2018 | Kuharenko ........... G06K 9/6274 |
| 2019/0065833 | A1* | 2/2019 | Wang ................... G06V 40/172 |
| 2019/0392122 | A1* | 12/2019 | Foster ..................... G06N 3/08 |

OTHER PUBLICATIONS

Computer English Translation of Chinese Patent No. CN 110866466 A, pp. 1-18. (Year: 2020).*
Hernandez-Ortega, et al. (FaceQnet: Quality Assessment for Face Recognition based on Deep Learning), pp. 1-8. (Year: 2019).*
Jia Deng et al., "ImageNet: A Large-Scale Hierarchical Image Database". 2009 IEEE conference on computer vision and pattern recognition, 2009, pp. 248-255.
Necmiye Ozay et al., "Improving Face Recognition with a Quality-based Probabilistic Framework". 2009 IEEE Computer Society Conference on Computer Vision and Pattern Recognition Workshops, 2009, pp. 134-141.

(Continued)

*Primary Examiner* — Daniel G Mariam
(74) *Attorney, Agent, or Firm* — Robert C. Kowert; Kowert, Hood, Munyon, Rankin & Goetzel, P.C.

(57) ABSTRACT

An image may be evaluated by a computer vision system to determine whether it is fit for analysis. The computer vision system may generate an embedding of the image. An embedding quality score (EQS) of the image may be determined based on the image's embedding and a reference embedding associated with a cluster of reference noisy images. The quality of the image may be evaluated based on the EQS of the image to determine whether the quality meets filter criteria. The image may be further processed when the quality is sufficient, or otherwise the image may be removed.

20 Claims, 10 Drawing Sheets

(56) References Cited

OTHER PUBLICATIONS

YongkangWong et al., "Patch-based probabilistic image quality assessment for face selection and improved video-based face recognition", arXiv:1304.0869v2, Mar. 14, 2014, Published in IEEE Conference on Computer Vision and Pattern Recognition Workshops (CVPRW) 2011, pp. 74-81.

Karen Simonyan, et al.,"Deep Inside Convolutional Networks: Visualising Image Classification Models and Saliency Maps", arXiv:1312.6034v2, Apr. 19, 2014, pp. 1-8.

Alex Kendall, et al., "Bayesian SegNet: Model Uncertainty in Deep Convolutional Encoder-Decoder Architectures for Scene Understanding", arXiv:1511.02680v2, Oct. 10, 2016, pp. 1-11.

Dario Amodei, et al., "Concrete Problems in AI Safety", arXiv:1606.06565v2, Jul. 25, 2016, pp. 1-29.

Yarin Gal, "Uncertainty in Deep Learning", Dissertation for the degree of Doctor of Philosophy, University of Cambridge, Sep. 2016, pp. 1-166.

Yarin Gal, et al., "Dropout as a Bayesian Approximation: Representing Model Uncertainty in Deep Learning", In Proceeding of the 33rd International Conference on Machine Learning, 2016, pp. 1050-1059.

Ila Kemelmacher-Shlizerman, et al. "The MegaFace Benchmark: 1 Million Faces for Recognition at Scale", In Proceedings of the IEEE Conference on Computer Vision and Pattern Recognition, 2016, pp. 4873-4882.

Alex Kendall, et al., "What Uncertainties Do We Need in Bayesian Deep Learning for Computer Vision?" 31st Conference on Neural Information Processing Systems (NIPS 2017), pp. 1-12.

Yu Liu, et al., "Quality Aware Network for Set to Set Recognition". In Proceedings of the IEEE Conference on Computer Vision and Pattern Recognition, 2017, pp. 5790-5799.

Jason Wang, et al., "The Effectiveness of Data Augmentation in Image Classification using Deep Learning", arXiv:1712.04621v1, Dec. 13, 2017, pp. 1-8.

Jiaolong Yang, et al., "Neural Aggregation Network for Video Face Recognition", In Proceedings of the IEEE Conference on Computer Vision and Pattern Recognition, 2017, pp. 4362-4371.

Brianna Maze, et al., "IARPA Janus Benchmark—C: Face Dataset and Protocol", In 2018 International Conference on Biometrics (ICB), IEEE, 2018, pp. 158-165.

Gregoire Montavon, et al., "Methods for interpreting and understanding deep neural networks", Digital Signal Processing 73, 2018, pp. 1-15.

Prithviraj Dhar, et al., "On measuring the iconicity of a face", arXiv:1903.01581v1, Mar. 4, 2019, pp. 1-9.

Salman Khan, et al., "Striking the Right Balance with Uncertainty", In Proceedings of the IEEE Conference on Computer Vision and Pattern Recognition, 2019, pp. 103-112.

Yichum Shi, et al., "Probalilistic Face Embeddings", Proceedings of the IEEE International Conference on Computer Vision, 2019. Pages 6902-6911.

Florian Schroff, et al., "FaceNet: A Unified Embedding for Face Recognition and Clustering", arXiv:1503.03832v3, Jun. 17, 2015, pp. 1-10.

\* cited by examiner

METHODS AND SYSTEMS FOR PERFORMING NOISE-RESISTANT COMPUTER VISION TECHNIQUES

BACKGROUND

Computer vision techniques use machines to interpret and understand the visual world. With artificial intelligence and machine learning, machines can be trained to identify and classify objects in digital images from cameras and videos. Accuracy of computer vision heavily depends on the quality of the images that the machines see and process. Images including noise, such as blurry or corrupted images, can burden the computer vision systems. They require or even waste computing resources and also cause poor or wrong interpretations. Thus, it is desirable for techniques capable of evaluating the quality of images to be processed by computer vision systems.

Figure 1:
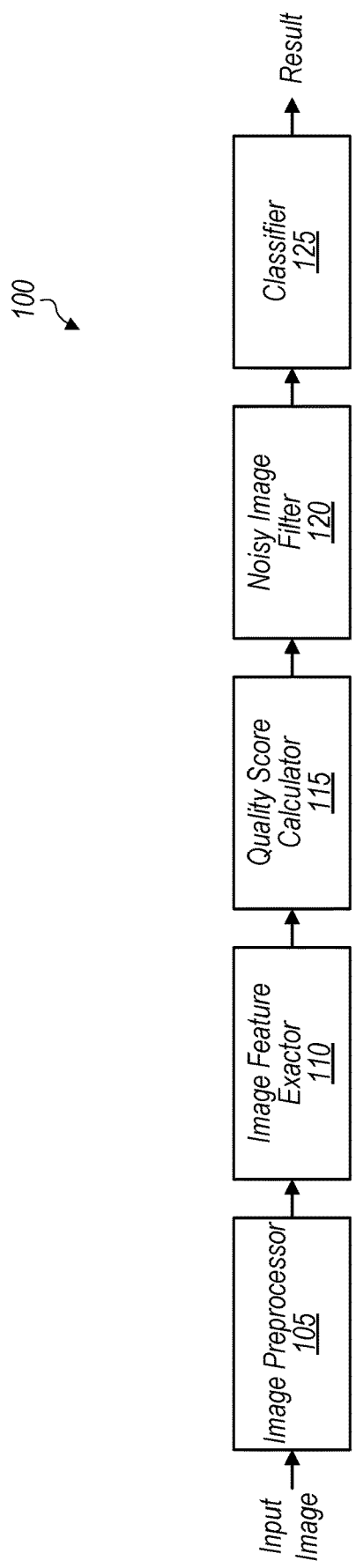
FIG. 1 is a block diagram showing an example computer vision system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Computer vision techniques use machines, such as computers or other computing devices, to interpret and understand the visual world. With artificial intelligence and machine learning, the machines can be trained to identify and classify objects in digital images from cameras and videos. As an example, in the context of face images, a computer vision system may be implemented to perform face detection—to identify the presence of people or people's faces within digital images. Further, a computer vision system may perform face verification where the computer vision system may compare two images and verify whether they identify the same person or faces of the same person. Moreover, a computer vision system may perform face recognition, wherein for a given face image, the computer vision system may search a database or gallery of people's images and establish whose face it is. Furthermore, a computer vision system may provide face clustering to inspect a set of people's images and cluster them into groups for specific individuals. Regardless of the types of image identification and classification, the accuracy of computer vision heavily depends on the quality of the images that the machines see and process. Again, as an example, in the context of face images, images including noise such as blurry images, corrupted images, and/or images that do not include people's faces at all, may burden the computer vision system. Here, the term "noise" may broadly refer to various effects or contaminations that can negatively impact the quality of images. The processing of those images may require or even waste computing resources. The noisy images may also cause poor or wrong interpretations of the computer vision system. Thus, it is desirable to have techniques, as a "gatekeeper," which are capable of evaluating the quality of images.

Various computer vision techniques including evaluation of image qualities are described in this disclosure. According to some embodiments, a computer vision system may include an image feature extractor to generate a feature representing an alleged object (e.g., a face) in an image. For instance, the feature may be an embedding for the alleged object. The embedding may capture important features of the image and may represent them in a machine-readable form, for instance, a n-dimensional vector having n floating point values. As the embedding is the feature vector representing the image, the quality of the image may be further evaluated based on the associated embedding. Therefore, in some embodiments, the computer vision system may include a quality score calculator that may determine a quality score for the image, such as an embedding quality score (EQS) of the image, based on the image's embedding and a reference embedding. According to some embodiments, the reference embedding may be associated with a cluster of reference noisy images. For instance, the reference embedding may be generated based on an average, e.g., an element-wise vector average, of embeddings of the reference noisy images. The reference embedding may be viewed as the feature vector of a representative noisy image. In some embodiments, the EQS may be determined as measurement of the similarity between the image's embedding and the reference embedding, which may then be used to predict the quality of the image. For instance, closer similarity with the reference embedding may infer that the image is more alike the representative noisy image—thus it is a low-quality image. Alternatively, more dissimilarity may tell that the image is more different from the representative noisy image and thus likely a high-quality image. In some embodiments, the similarity may be measured based on the cosine similarity between embeddings. The computer vision system may also include a noisy image filter, according to some embodiments. The noisy image filter may determine whether the quality of the image meets one or more filter criteria. For a high-quality image whose quality meets the filter criteria, the noisy image filter may send the image to a classifier for further analysis. Conversely, when a low-quality image fails to meet the filter criteria, the noisy image filter may determine that the image is not fit for further analysis and thus remove the image. In some embodiments, the noisy image filter may perform the evaluation by comparing the EQS of the image to the filter criteria. In some embodiments, the filter criteria may include one or more pre-determined and/or user-customizable criteria. For purposes of illustration, techniques are described in this disclosure in the context of face image. One with ordinary skills in the art should appreciate that the disclosed systems, methods and techniques can be implemented and applied in numerous ways in various computer vision systems.

FIG. 1 shows an example computer vision system, according to some embodiments. In this example, computer vision system 100 may include image preprocessor 105, image feature extractor 110, quality score calculator 115, noisy image filter 120, and classifier 125. According to some embodiments, image preprocessor 105 may receive an input image, such as a face image. Image preprocessor 105 may perform various preprocessing operations on the input image, such as face detection (e.g., chopping irrelevant portions to extract an alleged face portion from the image), pixel brightness (e.g., brightness correction, gray scale transformation, etc.), geometric modification (e.g., alignment, resize, chopping, geometric distortion elimination, etc.), image restoration, and so on, according to some embodiments. The purpose of the preprocessing is to improve image data up-front to suppress unwanted distortions and/or enhance features important for further analysis.

Once preprocessed, the input image may be provided to image feature extractor 110, which may generate a feature representing an alleged object (e.g., a face) of the input image, e.g., an embedding for the alleged object. As described above, the embedding may include one or more features of the image and represent them in a machine-readable form, for instance, a n-dimensional vector having n floating point values. Conceptually, the embedding may be viewed as a mapping of the input image data from a high-dimensional image space to a low-dimensional embedding (feature) space. In some embodiments, the embedding may be determined such that a distance between face images of the same identity is small whereas the distance between face images from different identities is large. Thus, the input image may be efficiently classified based on measuring the distance between the image's embedding from that of a target image(s). In some embodiments, the embedding may be generated in a manner such that the Euclidean norm of an embedding vector (i.e., the length of the vector) equals to 1. In some embodiments, image feature extractor 110 may be pre-trained. Example techniques to generate image embeddings are described below. What is important is that, as the embedding includes characteristics of the input image, the quality of the input image may be evaluated based on the associated embedding.

In some embodiments, computer vision system 100 may include quality score calculator 115 to determine a quality score such as an EQS to represent the quality of the input image. According to some embodiments, the EQS may be determined based on the input image's embedding and a reference embedding associated with a cluster of reference noisy images. The reference noisy images may be a set of images that are known to include noise. For instance, the reference noisy images may include blurry images, corrupted images, and/or images that do not include people's faces at all. In other words, the reference noisy images may represent low-quality images that may include characteristics capable to cause low-confidence classification results, e.g., false positive classifications, and thus supposedly be discarded by computer vision system 100. According to the quality requirements, different sorts of noisy images may be selected as the reference noisy images. For instance, for stringent quality requirements, the cluster of reference noisy image may include low-quality or even medium-quality images, such that only high-quality images are retained. Alternatively, for less stringent quality requirements, only extremely low-quality images may be used, such that only those images are to be removed. Once the cluster of reference noisy images are determined, they may be provided to generate the respective embeddings, e.g., by image preprocessor 105 and image feature extractor 110. As described above, the embeddings have the property such that the embeddings of similar images are close to each other while those from different images are far away from each other. Thus, because the reference noisy images all belong to the category of low-quality images, their respective embedding may locate in proximity with each other in the embedding space. In some embodiments, the reference embedding may be determined based on the embeddings of the reference noisy images, e.g., by element-wise averaging the embedding vectors of the reference noisy images. The reference embedding may represent the embedding of a conceptually representative noisy image. Given the input image's embedding and the reference embedding, the EQS of the input image may be determined based on the distance measuring the similarity between the two embeddings, e.g., a cosine similarity. According, more similarity with the reference embedding may infer that the input image is more alike the representative noisy image—thus it is a low-quality image.

Alternatively, less similarity may tell that the input image is more likely a high-quality image.

Figure 2:
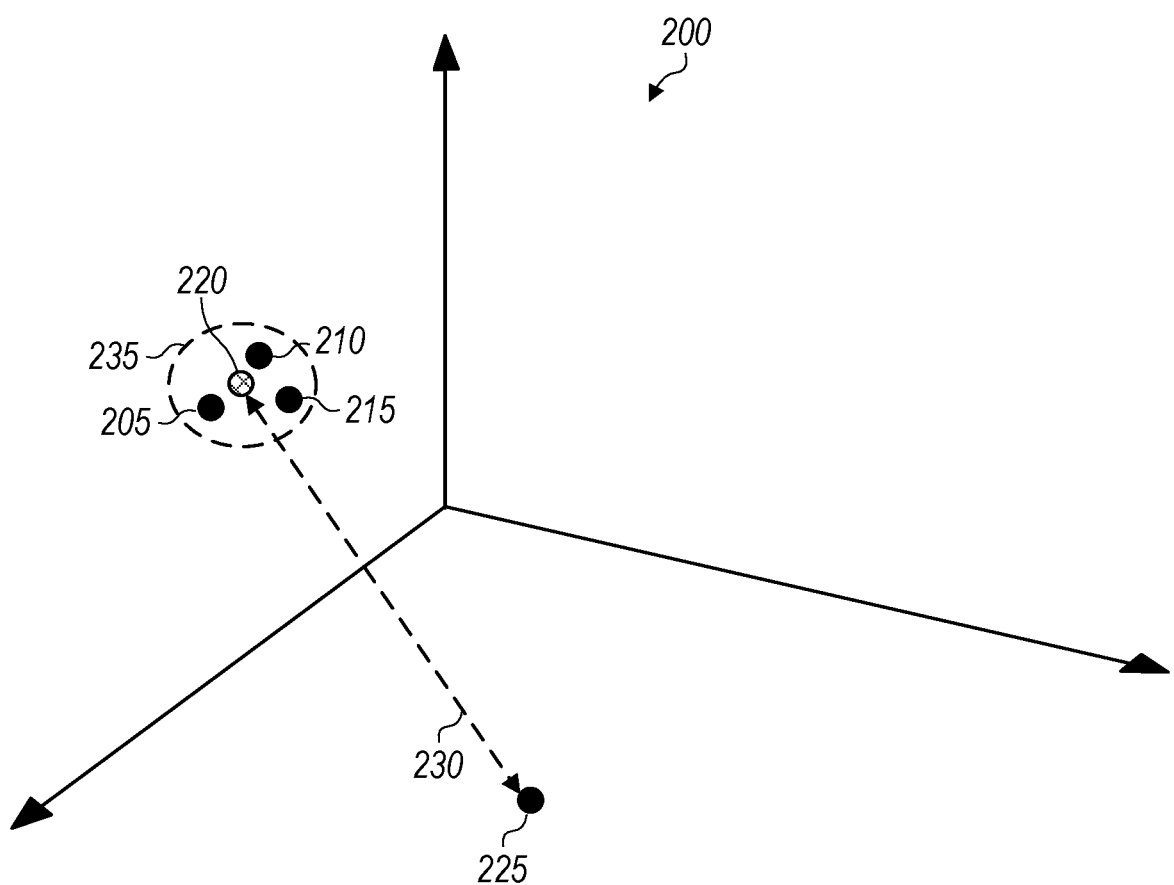
FIG. 2 is a diagram showing example distributions of embeddings in an embedding space.

Distances of embeddings are shown in an example 3-dimensional embedding space in FIG. 2. In this example, the embeddings are 3-dimensional vectors. As shown in FIG. 2, dots 205, 210 and 215 may represent the embedding vectors of 3reference noisy images. As described above, since the reference noisy images are all low-quality images, their embeddings (e.g., dots 205-215) may be clustered together in proximity in the 3-dimensional space, e.g., shown by circle 235. Based on the embeddings of the reference noisy images, EQS score calculator 115 may determine a reference embedding, represented by dot 220. In some embodiments, the reference embedding may be determined by averaging the three embeddings of the reference noisy images, e.g., according to equation (1):

$$\bar{f} = \left(\frac{\sum_{i}^{K} f_i}{K}\right) \bigg/ \left|\frac{\sum_{i}^{K} f_i}{K}\right| \quad (1)$$

where $\bar{f}$ represents the reference embedding (e.g., shown by dot 220), $f_i$ represents the respective embeddings of the 3 reference noisy images (e.g., shown by dots 205-215), K is the total number of reference noisy images (e.g., K=3), and |.| is the Euclidean norm (or length) of a vector—thus, the reference embedding $\bar{f}$ is a normalized vector whose Euclidean norm equals to 1 as described above. For the input image, image feature extractor 110 may generate an embedding of the input image, e.g., shown by dot 225. Depending of the quality of the input image, dot 225 may be located close to or far from dot 220. For instance, when the input image is a low-quality image like the reference noisy images, distance 230 between dots 220 and 225 may be small. Conversely, when the input image is different from the reference noisy image and instead include high-quality image data, distance 230 between dots 220 and 225 may be large. For purposes of illustration, FIG. 2 illustrates the distance between dots 220 and 225 by edge 230. In some embodiments, the similarity between embeddings in the embedding space may be measured in various ways. For example, the similarity may be determined based on a cosine similarity between two vectors, as described below.

Referring back to FIG. 1, once the input image's embedding and the reference embedding are generated, quality score calculator 115 may determine the EQS for the input image. In some embodiments, the EQS may be determined based on a distance between the input image's embedding and the reference embedding, e.g., according to equations (2) and (3):

$$\text{sim}(\bar{f}, f_{input}) = (\bar{f}, f_{input})/(|\bar{f}| \times |f_{input}|) \quad (2)$$

$$\text{EQS}_{input} = \min(1 - \text{sim}(\bar{f}, f_{input}), 1) \quad (3)$$

where $\text{sim}(\bar{f}, f_{input})$ represents the cosine similarity between reference embedding $\bar{f}$ and input image's embedding $f_{input}$, $(\bar{f}, f_{input})$ is the dot product of $\bar{f}$ and $f_{input}$ (e.g., the sum of element-by-element products of the two vectors), |.|is the Euclidean norm, $\text{EQS}_{input}$ is the EQS score of the input image, and min(.) is the minimum function that returns the smaller of the two values in the parenthesis. Equations (2) and (3) may provide a few observations. One, both sim and $\text{EQS}_{input}$ are scalar values in the range of 0 and 1. Two, a sim value of 0 means that the two vectors $\bar{f}$ and $f_{input}$ are at 90 degrees to each other (orthogonal) and have no match, which further infers that the value of $\text{EQS}_{input}$ is close to 1. Conversely, when the sim value becomes closer to 1, the smaller the angle and the greater the match between $\bar{f}$ and $f_{input}$, and the smaller value of $\text{EQS}_{input}$. Thus, the value of $\text{EQS}_{input}$ may be used as a prediction about the quality of the input image. For instance, a larger $\text{EQS}_{input}$ may infer a higher quality for the input image, while a smaller $\text{EQS}_{input}$ may signal a lower quality of the input image. Note that the distance or similarity between embedding vectors may be measured in various ways, and the cosine similarity is only one example for purposes of illustration. For instance, the distance or similarity may be defined as the length of a differential vector between the two vectors, a dot product of the two vectors, etc.

As shown FIG. 1, in some embodiments, computer vision system 100 may include noisy image filter 120. Noisy image filter 120 may include one or more filter criteria. Noisy image filter 120 may evaluate the quality of the input image and determine whether it meets one or more filter criteria. When the quality meets the criteria, noisy image filter 120 may send the input image to further processing, e.g., by classifier 125. Conversely, if the quality fails to meet the criteria, noisy image filter 120 may determine that the input image is not fit for further analysis and thus remove the input image. In some embodiments, the evaluation of the quality may be implemented based on the EQS of the input image (e.g., $\text{EQS}_{input}$). For instance, noisy image filter 120 may compare $\text{EQS}_{input}$ to one or more criteria, wherein the one or more criteria may include a threshold of a scalar value. When $\text{EQS}_{input}$ exceeds the threshold (e.g., $\text{EQS}_{input} \geq$ threshold), noisy image filter 120 may select the input image to classifier 125 for further processing. However, when $\text{EQS}_{input}$ fails to meet the threshold (e.g., $\text{EQS}_{input} <$ threshold), noisy image filter 125 may discard the input image. In some embodiments, the filter criteria may be pre-determined by computer vision system 100. In other embodiments, the filter criteria may include at least one customizable criterion that are determined by a user of computer vision system 100. For instance, computer vision system 100 may provide a default value or a recommended range for the at least one criterion, based on which the user may determine the final value or range of the criterion.

In some embodiments, computer vision 100 may include classifier 125 to recognize and/or verify the input image, as shown in FIG. 1. As for face recognition, computer vision system 100 may have access to a database that stores a set of images of one or more people. Classifier 125 may search the database, compare the input image to the stored images, and determine whether there is a match. According to some embodiments, classifier 125 may perform the face recognition based on comparing distances between the embedding of the input image $f_{input}$ and respective embeddings of the stored images. As described above, close distances may indicate similarity or even a match of the identity, while far distances may infer dissimilarity between the identities. In some embodiments, classifier 125 may perform face verification, wherein classifier 125 may verify whether two images identify the same person. In some embodiments, the face verification may be implemented based on the distance or similarity between embeddings of the two images. Upon completion of the classification, classifier 125 may produce a result. For instance, classifier 125 may report the recognized identity, a positive verification, or a notification that no match is found.

Figure 3:
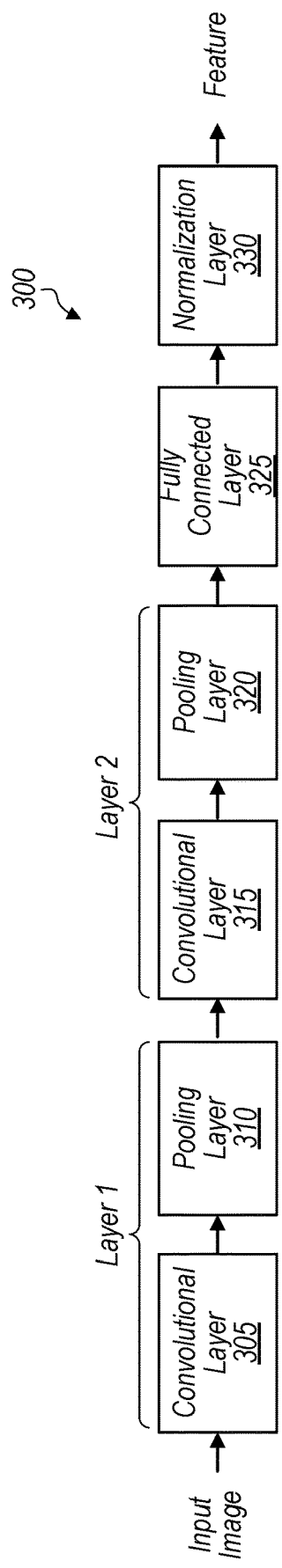
FIG. 3 is a block diagram showing an example image feature extractor, according to some embodiments.

FIG. 3 shows an example image feature extractor, according to some embodiments. The image feature extractor, e.g., image feature extractor 110 in FIG. 1, may be implemented based on various artificial intelligence and machine learning models. For instance, the image feature extractor may be implemented based on neural networks, support vector machines, principal component analysis, and the like. In some embodiments, the image feature extractor may be implemented based on a convolutional neural network (CNN). In the example in FIG. 3, the image feature extractor may be created based on a 2-layer CNN. In FIG. 3, image feature extractor 300 may include layer 1 and layer 2, each of which may include a convolutional layer (e.g., convolutional layers 305 and 315, respectively) and a pooling layer (e.g., pooling layers 310 and 320, respectively). Convolutional layers 305 and 315 may each consist of one or more filters (or kernels), where each filter may be treated as a "chopping" window. Convolutional layers 305 and 315 may slide the windows throughout the input image area-by-area (which is called "convolving") to calculate activations for the pooling layer. Operations of pooling layers 310 and 320 are conceptually equivalent to down-sampling—down-sampling the activations from respective previous convolution layers 305 and 315 to reduce the amount of data for processing. In some embodiments, pooling layers 310 and 320 may be implemented based on the max pooling function. Max pooling may partition the activations from respective previous convolutional layers 305 and 315 into a set of non-overlapping rectangles and, for each such sub-region, outputs a maximum. In some embodiments, image feature extractor 300 may also include fully connected layer 325. If operations of convolutional and pooling layers are viewed as feature extraction, then operations of fully connected layer 325 may be considered as learning of a hidden layer of a neural network, and the embedding may represent the hidden layer's states. Fully connected layers 325 may include a set of neurons each of which may be connected to all activations produced in the previous layer through weighted connections, as seen in regular feedforward artificial neural networks. Similarly, fully connected layer 325 may further include a bias input that is connected to individual neurons through weighed connections. Each neuron of fully connected layer 325 may calculate the sum of the weighted activations from (1) the previous layer and (2) the bias, and produce its own activation. According to some embodiments, image feature extractor 300 may further include normalization layer 330 for generating the feature, e.g., an embedding, representing the input image. The purpose of normalization layer 330 is to rescale values of the embedding to assist the training and calculations of image feature extractor 300. Various normalization functions may be adopted to implement normalization layer 330, such as binary step function, linear activation function, sigmoid function, hyperbolic tangent or tanh function, rectified linear unit or ReLU function, leaky ReLU function, parametric ReLU function, softmax function, Swish function, etc. In some embodiments, normalization layer 330 may be implemented based on a (ReLU function that applies a non-saturating activation function such as $ReLU(x)=max(0, x)$. According to some embodiments, image feature extractor 300 may be pre-trained before being deployed for calculation of the EQS. For instance, image feature extractor 300 may receive a set of training data as the input image and get trained in a supervised mode. Based on the output, the embedding for each training data, image feature extractor 300 may calculate a loss function, which may be backpropagated to update parameters (e.g., weights) of fully connected layer 325. The parameters may be updated to minimize the distances between embeddings of similar images and maximize the distances between embeddings of dissimilar images. With the training, image feature extractor 300 may acquire knowledge and establish capabilities to produce an appropriate embedding for an input image. Once trained, image feature extractor 300 may be deployed without separate trainings to generate the feature, e.g., an embedding, for an input image, embeddings of reference noisy images, and template embedding as described in FIGS. 1-2 and 4-8. For purposes of illustration, FIG. 3 depicts only two convolutional-pooling layers, one fully connected layer, and one normalization layer. In some embodiments, image feature extractor 300 may include less or more convolutional-pooling layers, less or more fully connected layers, and/or less or more normalization layers residing before, after, or in-between the convolutional, pooling, and fully connected layers.

Figure 4:
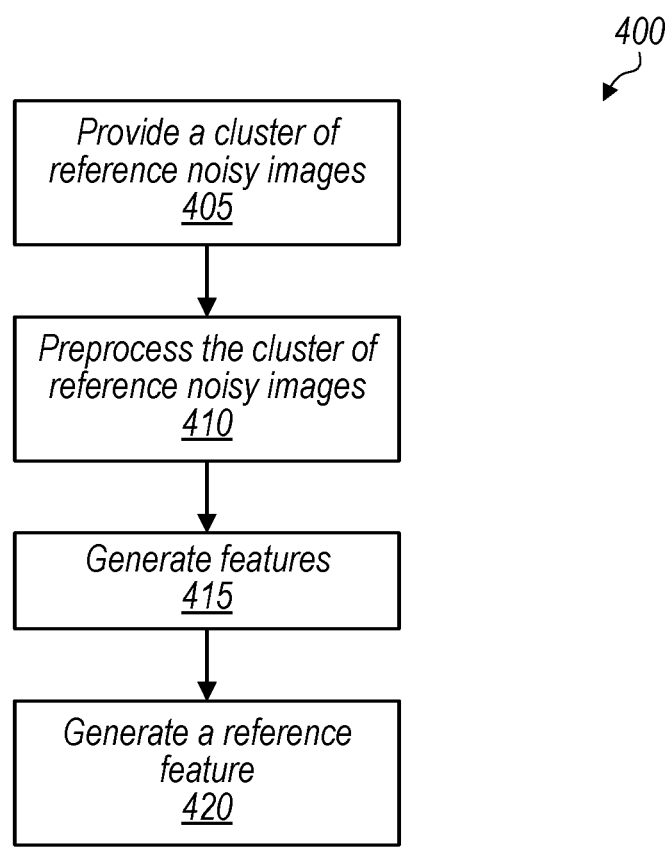
FIG. 4 is a flowchart showing an example operation to generate a reference embedding, according to some embodiments.

FIG. 4 depicts an example operation to generate a reference embedding, according to some embodiments. In FIG. 4, operation 400 may start with providing a cluster of reference noisy images (block 405). As described above, the reference noisy images may be a set of images that include input noise. They may represent low-quality image references against which the quality of an input image may be evaluated. According to the quality requirements, different sorts of noisy images may be selected as the reference noisy images accordingly. In some embodiments, the cluster of reference noisy images may be preprocessed, for instance, by preprocessor 105 as described with respect to FIG. 1 (block 405). The preprocessing may align, adjust, or modify individual reference noisy images, as needed, to prepare them for further analysis. In some embodiments, the reference noisy images may be further sent to an image feature extractor, e.g., image feature extractor 110/330 in FIGS. 1 and 300, which may generate respective features, e.g., embeddings, for the reference noisy images (block 415). As described above, the image feature extractor may have been pre-trained, as described above in FIG. 3. Based on the respective embeddings of the reference noisy images, a reference feature, e.g., a reference embedding, may be generated (block 420). In some embodiments, the reference embedding may be determined based on an average of the embeddings of the reference noisy images, e.g., according to equation (1).

Figure 5:
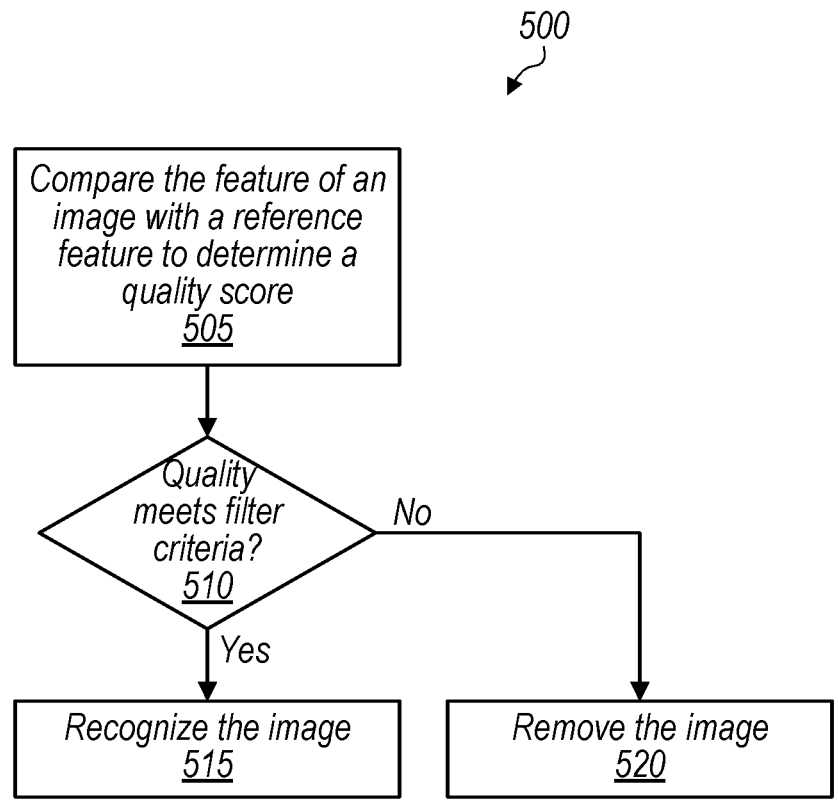
FIG. 5 is a flowchart showing an example operation to perform face recognition, according to some embodiments.

FIG. 5 shows an example operation to perform face recognition, according to some embodiments. In FIG. 5, operation 500 may start with comparing the feature, e.g., an embedding, representing an alleged object (e.g., face) from an image with a reference feature, e.g., a reference embedding, representing the reference noisy images to determine a quality score (e.g., EQS) for the alleged object (block 505). In some embodiments, the embedding for the alleged object may be generated based an image preprocessor (e.g., image preprocessor 105 in FIG. 1) and an image feature extractor (e.g., image feature extractor 110/300 in FIGS. 1-3). In some embodiments, the image feature extractor may have been pre-trained before the deployment. Based on the embedding, operation 500 may determine an EQS based on (1) the image's embedding and (2) a reference embedding associated with a cluster of reference noisy images, using an quality score calculator, e.g., quality score calculator 115 in FIG. 1, according to equations (2)-(3) as described above (block 510). The EQS may represent measurement of similarity between the image and the cluster of reference noisy images. In some embodiments, the EQS may be determined based on a cosine similarity between the image's embedding and the reference embedding, according to equations (2)-(3) as described above. In some embodiments, a larger EQS may represent less similarity to the cluster of reference noisy images (and thus a high probability that the quality of the image is good) and a smaller EQS may infer more similarity to the cluster of reference noisy images (and thus a low probability that the quality of the image is good). The quality of the image may be evaluated, using a noisy image filter, e.g., noisy image filter 120 in FIG. 1, to determine whether the quality meets one or more filter criteria (block 510). In some embodiments, the evaluation may be implemented based on comparing the image's EQS to the criteria. For instance, the criteria may include a scalar threshold, and the noisy image filter may determine whether the EQS is less than the threshold. When the EQS is not less than the threshold, the quality of the image may be determined to meet the filter criteria. Alternatively, when the EQS is less than the threshold, the quality of the image may be deemed insufficient. In response to a determination that the quality meets the criteria, the image may be selected for further analysis, e.g., face recognition by a classifier, e.g., by classifier 125 in FIG. 1 (block 515). The classifier may search a database (or gallery) of stored people's image to recognize whether the image identifies one person in the database. In some embodiments, the face recognition may be performed based on comparing distances between the embedding of the image and respective embeddings of the people's images. For instance, when the distances (e.g., cosine similarities) between the image's embedding and embeddings of the images of a specific person is less than a threshold, the classifier may determine that there is a match. In some embodiments, the gallery may be developed based on quality evaluation as well. For instance, the images in the gallery may be evaluated based on their respective quality scores that may be determined based on comparing their respective features (e.g., embeddings) with the reference feature (e.g., embedding) associated with the cluster of reference noisy images. Images with insufficient quality scores may be removed, and the gallery may thus contain only images of satisfactory quality. In some embodiments, in response to determining that the quality of the image fails to meet the criteria, the image may be removed (block 520). For purposes of illustration, the respective embeddings of the people's images may have been pre-generated, e.g., by image feature extractor 110/300 in FIGS. 1-3, and stored in a database, although not shown in FIG. 5.

Figure 6:
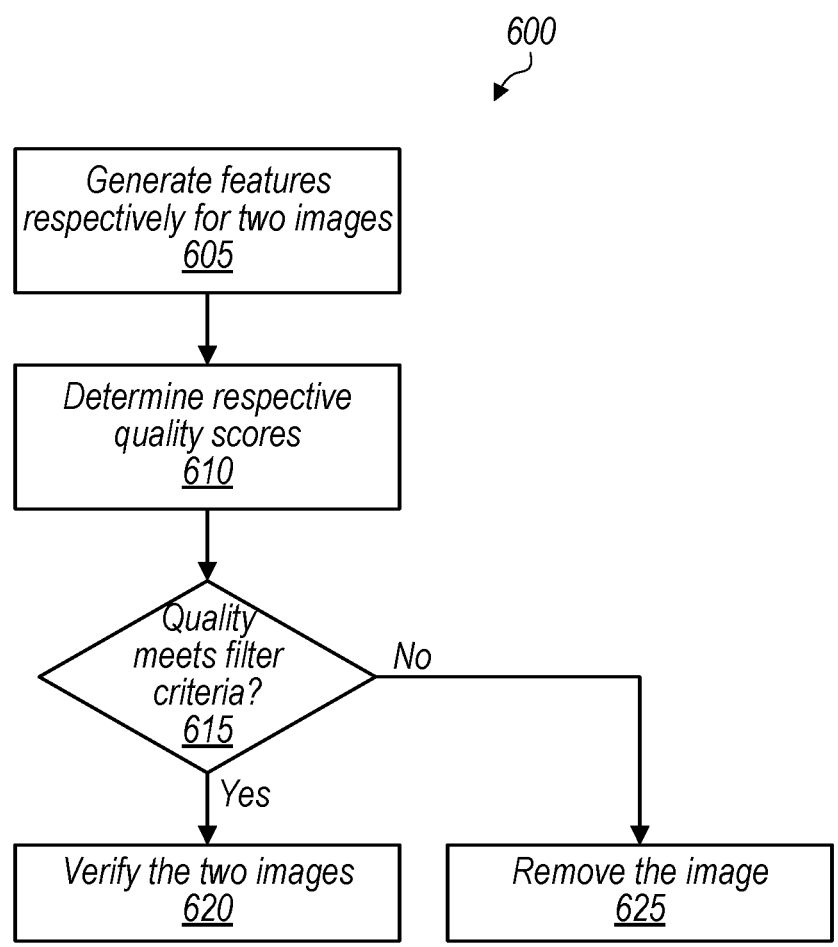
FIG. 6 is a flowchart showing an example operation to perform face verification, according to some embodiments.

FIG. 6 shows an example operation to perform face verification, according to some embodiments. Compared to the face recognition in FIG. 5 that is based on a 1-to-n search and comparison, face verification may include a 1-to-1 comparison to verify whether two images identify the same object (e.g., a same person or faces of the same person). In FIG. 6, operation 600 may start with generating features, e.g., two embeddings, for two images using an image feature extractor, e.g., image feature extractor 110/300 in FIGS. 1-3 (block 605). In some embodiments, the image feature extractor may have been pre-trained before the deployment. Based on the embeddings, operation 600 may determine a quality score, e.g., an EQS, for each of the two images based on (1) an image's embedding and (2) a reference embedding associated with a cluster of reference noisy images, using an quality score calculator, e.g., quality score calculator 115 in FIG. 1, according to equations (2)-(3) as described above (block 610). The EQS may represent measurement of similarity between the image and the cluster of reference noisy images. In some embodiments, the EQS may be determined based on a cosine similarity between the image's embedding and the reference embedding, according to equations (2)-(3) as described above. In some embodiments, a larger EQS may represent less similarity to the cluster of reference noisy images (and thus a high probability that the quality of the image is good) and a smaller EQS may infer more similarity to the cluster of reference noisy images (and thus a low probability that the quality of the image is good). The quality of the two images may be evaluated, using a noisy image filter, e.g., noisy image filter 120 in FIG. 1, to determine whether their quality meets one or more filter criteria (block 615). In some embodiments, the evaluation may be implemented based on comparing an image's EQS to the criteria. For instance, the criteria may include a scalar threshold, and the noisy image filter may determine whether the EQS is less than the threshold. When the EQS is not less than the threshold, the quality of the image may be determined to meet the filter criteria. Alternatively, when the EQS is less than the threshold, the quality of the image may be deemed insufficient. In response to a determination that the quality of both images meets the criteria, the two images may be sent to further analysis, e.g., face verification by a classifier, e.g., by classifier 125 in FIG. 1 (block 620). The classifier may compare the features, e.g., embeddings, of the two image to verify whether they identify the same person. In some embodiments, the face verification may be performed based on comparing the distance between embeddings of the two images. In some embodiments, in response to determining that the quality of one or both of the images fails to meet the criteria, the two images may be removed from verification or a negative match or mismatch between the two images may be predicted for the verification (block 625). In some embodiments, the feature or embedding of the second image may have been pre-generated (not shown), e.g., by image embedding extractor 110/300 in FIGS. 1-3, and stored in a database.

Figure 7B:
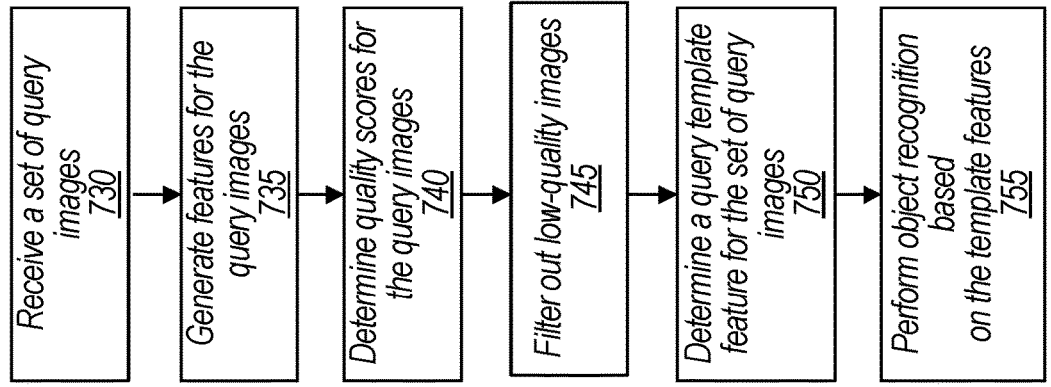
FIG. 7A and 7B are flowcharts showing example operations to perform template-based face recognition, according to some embodiments.
Figure 7A:
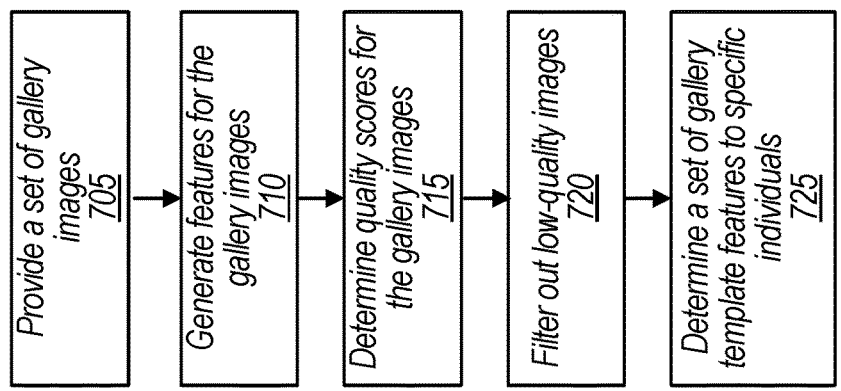

FIGS. 7A-7B show an example operation to perform template-based face recognition, according to some embodiments. A template may include a set of images (e.g., one or more digital images from cameras or videos) of an object which may be combined into a single representation (e.g., a template feature) suitable for feature matching. Thus, template-based object recognition may be considered as a set-to-set instead of image-to-image search. Template-based representations are important for many computer vision tasks, which take advantages of an historical record of observations to further improve performance. For instance, a template may include a set of historical images from an individual's drive licenses in civil identity credentials for improved access control. Similar to the face recognition described above in FIG. 5, template-based face recognition is also a one-to-many matching wherein a computer vision system may search an image database to identify a match for a given image. However, the major difference may exist in the generation of template embeddings. Again, taking face recognition as an example, FIG. 7A shows the generation of gallery template features for individuals based on stored gallery images. As shown in FIG. 7A, the creation of gallery template embeddings may start with providing a set of people's images, e.g., by accessing an image database or gallery (block 705). In some embodiments, the set of images may be divided into one or more subsets of images, one subset for one individual person. For instance, if the set of images include face images of two persons A and B, the images may be split into two subsets, one containing images of A while the other including images of B. For each person, a template feature, e.g., a template embedding may be generated based on the corresponding subset of gallery images. The respective embeddings of the gallery images in each subset may be generated using an image feature extractor, e.g., image feature extractor 110/300 as described above in FIG. 1-3 (block 710). In some embodiments, the image feature extractor may have been pre-trained before the deployment. Based on the generated embeddings, quality scores, e.g., EQS's, of the gallery images in each subset may be determined based on the generated embeddings and a reference embedding associated with a cluster of reference noisy images using an quality score calculator, e.g., quality score calculator 115 in FIG. 1, according to equations (2)-(3) as described above (block 715). The qualities of the gallery images within each subset may be evaluated using a noisy image filter, e.g., noisy image filter 120 in FIG. 1, to determine whether any of the gallery images in the subsets shall be removed (block 720). In some embodiments, the quality evaluation may be determined based on the EQS's of the gallery images. For any image of the subset (e.g., subset A) whose EQS fails to meet the criteria, that gallery image may be discarded, and the gallery template embedding specific to the individual (e.g., person A) may be determined based the embeddings of the remaining gallery images in the subset corresponding for the individual (e.g., person A) (block 725). In some embodiments, the gallery template embedding may be generated by averaging the features, e.g., element-wise averaging of the embedding vectors, of the remaining gallery images, e.g., according to equation (1). When none of the gallery images of the subset (e.g., subset A) meet the quality requirement, the entire subset (e.g., subset A) may be discarded, and images for the specific person (e.g., A) may be recollected to re-determine the gallery template feature for the specific person. A gallery template embedding for an individual may be treated as the feature vector of a representative image of the individual. Thus, face recognition may be implemented more efficiently based on the template embedding of the individual rather than relatively lower-efficient image-to-image comparison. For instance, the face recognition may not have to require to search and compare individual images of an image database or gallery. Instead, it may be performed based on comparing the template embedding of an input image to only a limited number of gallery template embeddings, each gallery template embedding specific to one known person in the database.

FIG. 7B shows an example operation to perform face recognition given the gallery template embeddings. In some embodiments, the face recognition may start with receive a set of query images of one individual for recognition, e.g., a set of digital images from cameras and videos (block 730).

In some embodiments, a feature such as an embedding may be determined individually for the query images using an image feature extractor, e.g., image feature extractor 110/300 in FIGS. 1-3 (block 735). Based on the embeddings, a quality score, e.g., an EQS, may be determined for the indivudal query images based on the their respective embeddings and a reference embedding associated with a cluster of reference noisy images using an quality score calculator, e.g., quality score calculator 115 in FIG. 1, according to equations (2)-(3) as described above (block 740). The quality of the query images may be evaluated to determine whether the individual images shall be filtered out by a noisy image filter, e.g., noisy image filter 120 in FIG. 1 (block 745). In some embodiments, the quality evaluation may determination based on the EQS of an image. For instance, the noisy image filter may compare the EQS of the image to one or more filter criteria including a scalar threshold to determine whether the EQS is less than the threshold. When the EQS is not less than the threshold, the noisy image filter may determine that the quality of the image meets the filter criteria, and move the image to face recognition, e.g., by a classifier such as classifier 125 in FIG. 1. Conversely, when the EQS is less than the threshold, the noisy image filter may determine that the quality of the image is insufficient and that the image may be removed. A query template feature for the set of query images may be determined based on the features or embeddings of the remaining query images (block 750). For instance, the query template feature or query template embedding may be calculated based on element-wise averaging of the embedding vectors of the remaining query images. The query template feature may be compared with each of the gallery template feature to perform the object recognition. For instance, the comparison may determine the distances between the query template feature from each of the gallery template features and predict a match when the distance meets a threshold.

Figure 8:
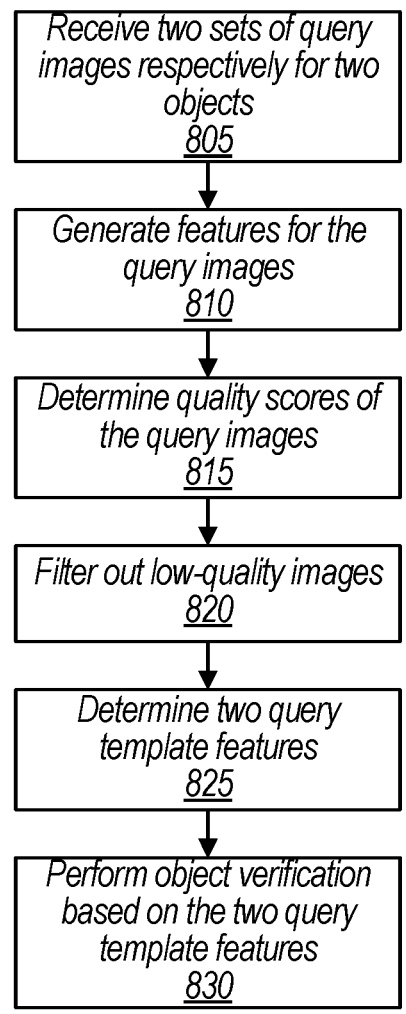
FIG. 8 is a flowchart showing example operations to perform template-based face verification, according to some embodiments.

FIG. 8 shows an example operation to perform template-based face verification, according to some embodiments. In some embodiments, the face verification may start with receive two sets of query images for verification, wherein each set may be specific for one object (block 805). The task of the face verification is to verify whether they are or identify the same object. The face verification may generate features, e.g., embeddings, of the query images using an image feature extractor, e.g., image feature extractor 110/300 in FIGS. 1-3 (block 810). Based on the embeddings, a quality scores such as EQS' s may be determined individually for the query images based on their respective embeddings and a reference embedding associated with a cluster of reference noisy images using an quality score calculator, e.g., quality score calculator 115 in FIG. 1, according to equations (2)-(3) as described above (block 815). The quality of the query images may be evaluated to determine whether they shall be filtered out by a noisy image filter, e.g., noisy image filter 120 in FIG. 1 (block 820). In some embodiments, the quality evaluation may determination based on the EQS of the image. For instance, the noisy image filter may compare the EQS of the image to one or more filter criteria including a scalar threshold to determine whether the EQS is less than the threshold. When the EQS is not less than the threshold, the noisy image filter may determine that the quality of the image meets the filter criteria, and move the image to face verification, e.g., by a classifier such as classifier 125 in FIG. 1. Conversely, when the EQS is less than the threshold, the noisy image filter may determine that the quality of the query image is insufficient and that the image may be removed. A query template feature for each of the two sets of query images may be determined based on the features or embeddings of the remaining query images within each set (block 825). For instance, the query template feature or query template embedding may be calculated based on element-wise averaging of the embedding vectors of the remaining query images. The query template features may be compared with each other to verify whether there is a match or they identify the same object (block 830). For instance, the comparison may determine a distance between the two query template features and predict a match when the distance meets a threshold. In some embodiments, when none of the query images in one set meets the quality requirement, the entire set may be discarded and a mismatch between the two sets may be further predicted for the face verification.

Figure 9:
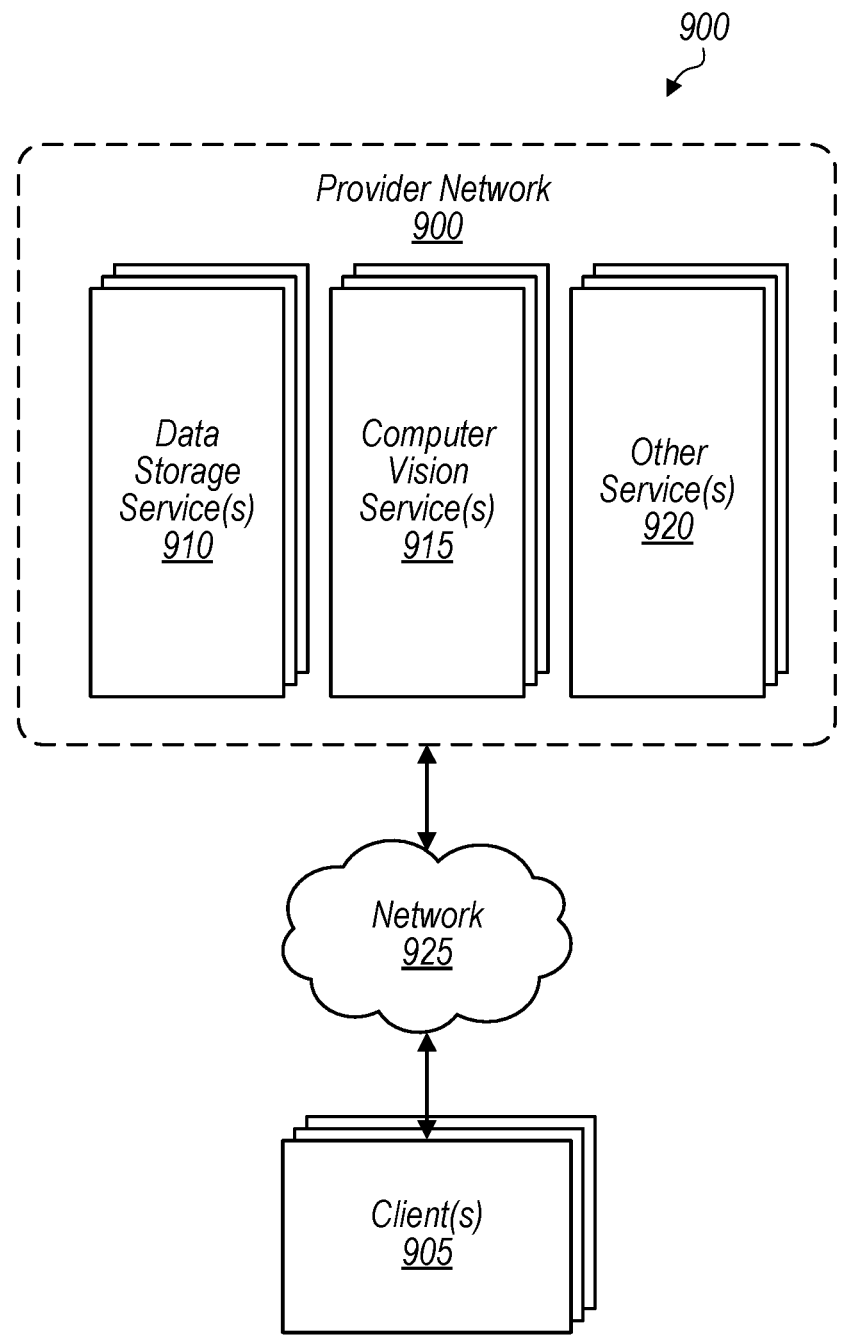
FIG. 9 is a block diagram showing an example provider network for providing computer vision as a network-based service, according to some embodiments.

FIG. 9 is a block diagram showing an example provider network for providing computer vision as a network-based service, according to some embodiments. In FIG. 9, provider network 900 may be a private or closed system or may be set up by an entity such as a company or a public sector organization to provide one or more services (such as various types of cloud-based storage) accessible via the Internet and/or other networks to one or more client(s) 905. Provider network 900 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by provider network 900. In some embodiments, provider network 900 may implement various computing resources or services, such as a data storage service(s) 910 (e.g., object storage services, block-based storage services, or data warehouse storage services), computer vision service(s) 915, as well as other service(s) 920, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 910 may implement different types of data stores for storing, accessing, and managing data on behalf of client(s) 905 as a network-based service that enables one or more client(s) 905 to operate a data storage system in a cloud or network computing environment. For example, data storage service(s) 910 may include various types of database storage services (both relational and non-relational) or data warehouses for storing, querying, and updating data. Such services may be enterprise-class database systems that are scalable and extensible. Queries may be directed to a database or data warehouse in data storage service(s) 910 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 910 may also include various kinds of object or file data stores for putting, updating, and getting data objects or files, which may include data files of unknown file type. Such data storage service(s) 910 may be accessed via programmatic interfaces (e.g., APIs) or graphical user interfaces. Data storage service(s) 910 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, computer vision service(s) 915 may be provided by provider network 900 as a network-based service to perform various image processing, such as face recognition, face verification, face detection, and/or face clustering. For purposes of illustration, computer vision service(s) 915 may be provided as a network-based face recognition service to client(s) 905. In some embodiments, computer vision service(s) 915 may receive a request from client(s) 905 via network 925, which may include one or more input face images provided by client(s) 905 to computer vision service(s) 915 for recognition. In some embodiments, computer vision service(s) 915 may include one or more pre-trained models that, response to the request, may be instantiated to implement one or more computer vision systems including image preprocessor(s), image feature extractor(s), embedding quality score calculator(s), noisy image filter(s), and/or classifier(s), such as those described above in FIGS. 1-8. Computer vision service(s) 915 may use the instantiated computer vision system(s) to evaluate the quality of the updated input face images, e.g., based on the EQS's of the images and one or more filter criteria. The filter criteria may include criteria that are pre-determined or specified by client(s) 905. For input face images that meet the filter criteria, computer vision service(s) 915 may recognize the images and return a result, e.g., as described above with respect o FIGS. 1-8. Alternatively, for input face images with undesired quality, computer vision service(s) 915 may discard the images, and may also provide an alert.

According to some embodiments, computer vision service(s) 915 may include one or more un-trained models that may be instantiated to implement one or more pre-trained models that, response to the request, may be instantiated to implement one or more computer vision systems including image preprocessor(s), image feature extractor(s), embedding quality score calculator(s), noisy image filter(s), and/or classifier(s). The operation of the un-trained models may be substantially similar to that of the above described pre-trained models, except that the un-trained models need to be first trained with customer dataset(s) from client(s) 905. For instance, the image feature extractor of an instantiated computer vision system may be trained to extract image features and generate embeddings with a custom training dataset from client(s) 905, as described in FIG. 2. Once trained, the image feature extractor may be used together with the quality score calculator of the computer vision system to generate a reference embedding based on a custom cluster of reference noisy images from client(s) 905. Once the reference embedding becomes available and the image feature extractor gets trained, the computer vision system may be used, as the above described one with pre-trained models, to evaluate qualities and perform recognition for input face images uploaded by client(s) 905.

Other service(s) 920 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 910. Various other distributed processing architectures and techniques may be implemented by data processing services (e.g., grid computing, sharding, distributed hashing, etc.). Note that in some embodiments, data processing operations may be implemented as part of data storage service(s) 910 (e.g., query engines processing requests for specified data).

Generally speaking, client(s) 905 may encompass any type of client configurable to submit network-based requests to provider network 900 via network 925, including requests for storage services (e.g., a request to create, read, write, obtain, or modify data in data storage service(s) 910, a request to perform various image processing tasks at computer vision service(s) 915, etc.). For example, a given client 905 may include a suitable version of a web browser, or may include a plug-in module or other type of code module configured to execute as an extension to or within an execution environment provided by a web browser. Alternatively, a client 905 may encompass an application such as a database application (or user interface thereof), a media application, an office application or any other application that may make use of storage resources in data storage service(s) 910 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 905 may be an application configured to interact directly with provider network 900. In some embodiments, client(s) 905 may be configured to generate network-based services requests according to a Representational State Transfer (REST)-style network-based services architecture, a document- or message-based network-based services architecture, or another suitable network-based services architecture.

In various embodiments, network 925 may encompass any suitable combination of networking hardware and protocols necessary to establish network-based-based communications between client(s) 905 and provider network 900. For example, network 925 may generally encompass the various telecommunications networks and service providers that collectively implement the Internet. Network 925 may also include private networks such as local area networks (LANs) or wide area networks (WANs) as well as public or private wireless networks. For example, both a given client 905 and provider network 900 may be respectively provisioned within enterprises having their own internal networks. In such an embodiment, network 925 may include the hardware (e.g., modems, routers, switches, load balancers, proxy servers, etc.) and software (e.g., protocol stacks, accounting software, firewall/security software, etc.) necessary to establish a networking link between given client 905 and the Internet as well as between the Internet and provider network 900. It is noted that in some embodiments, client(s) 905 may communicate with provider network 900 using a private network rather than the public Internet.

Figure 10:
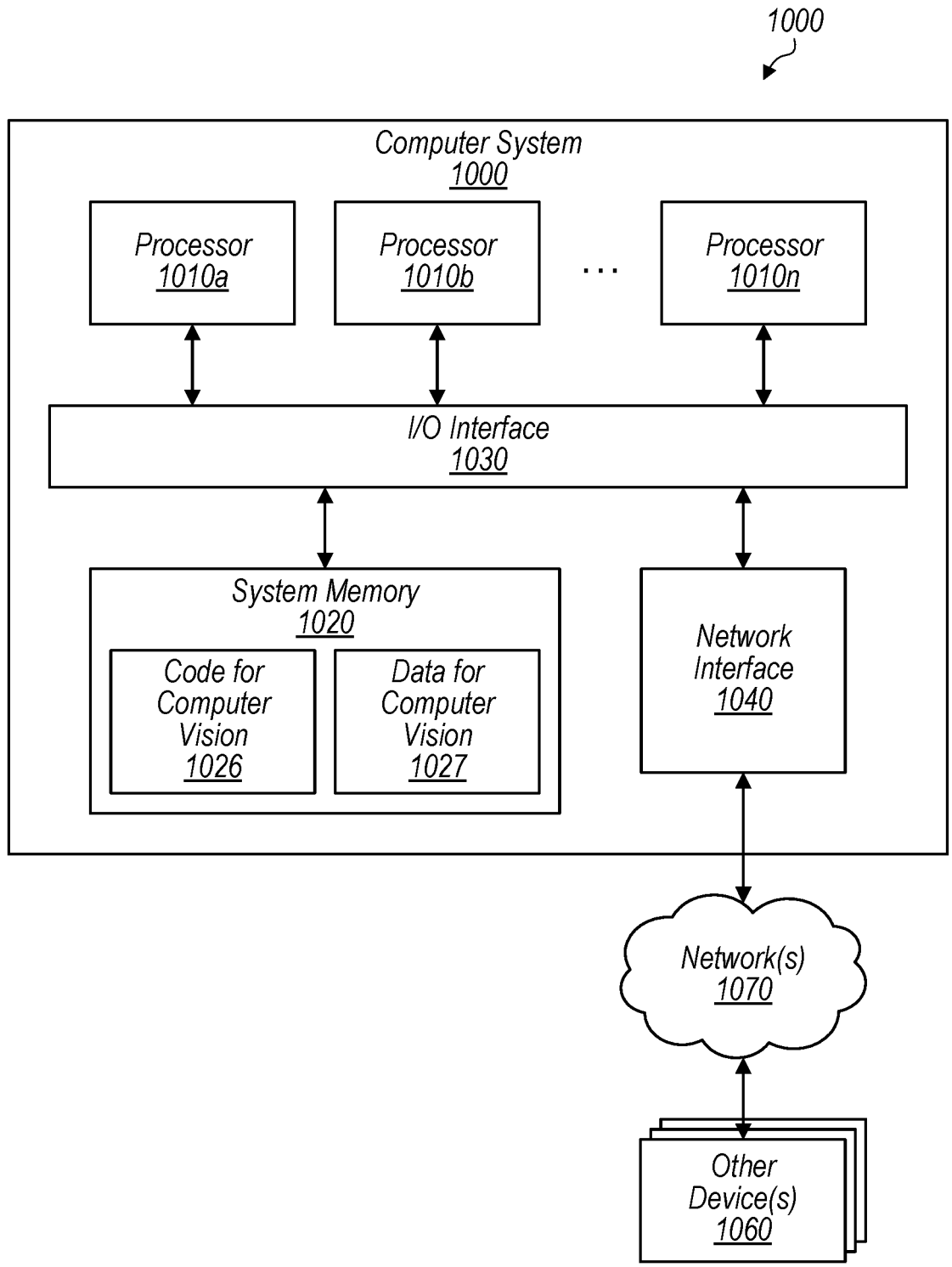
FIG. 10 is a block diagram showing an example computing system to implement the various techniques described herein, according to some embodiments.

FIG. 10 shows an example computing system to implement the various techniques described herein, according to some embodiments. For example, in one embodiment, computer vision system 100 may be implemented by a computer system, for instance, a computer system as in FIG. 10 that includes one or more processors executing program instructions stored on a computer-readable storage medium coupled to the processors. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be one embodiment of a computer-accessible medium configured to store instructions and data accessible by processor(s) 1010. In various embodiments, system memory 1020 may be implemented using any non-transitory storage media or memory media, such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040. In the illustrated embodiment, program instructions (e.g., code) and data implementing one or more desired functions, such as face recognition and verification described above in FIGS. 1-9, are shown stored within system memory 1030 as code 1026 and data 1027.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fiber Channel SANs, or via any other suitable type of network and/or protocol.

In some embodiments, system memory 1020 may be one embodiment of a computer-accessible medium configured to store program instructions and data as described above for FIG. 1- 9. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
 one or more computing devices configured to implement a computer vision system, wherein the computer vision system is configured to:
  generate a feature vector representing an alleged object in an image;
  compare the feature vector representing the alleged object with a reference feature vector for one or more image objects that include one or more characteristics capable to cause a false positive classification result of the one or more image objects according to an object classifier;
  determine a quality score for the alleged object according to the comparison; and
  responsive to a determination that the quality score satisfies one or more filter criteria for the object classifier, provide the feature vector to the object classifier to determine an object classification result for the alleged object.

2. The system of claim 1, wherein the quality score is determined based on a distance between the feature vector and the reference feature vector.

3. The system of claim 1, wherein the computer vision system is further configured to remove the image in response to a determination that the quality score for the alleged object does not meet the filter criteria.

4. The system of claim 1, wherein to determine the object classification result for the alleged object, the computer vision system is configured to compare the feature vector representing the alleged object with respective feature vectors for a plurality of image objects.

5. The system of claim 1, wherein the computer vision system is implemented as part of a computer vision service offered by a provider network, and wherein the image is received via a network-based interface for the computer vision service and stored in one or more storage resources that are implemented as part of a data storage service offered by the provider network.

6. A method, comprising:
 comparing, by a computer vision system, a representation of an alleged object from an image with a reference representation for one or more image objects that include one or more characteristics capable to cause a false positive classification result of the one or more image objects according to an object classifier to determine a quality score for the alleged object based, at least in part, on a result of the comparison; and
 responsive to determining that the quality score for the alleged object satisfies one or more filter criteria for the object classifier, providing the representation to the object classifier to determine an object classification result for the alleged object.

7. The method of claim 6, wherein the quality score is determined based on a distance between the representation of the alleged object and the reference representation.

8. The method of claim 7, wherein the distance is determined based on a cosine similarity between the representation of the alleged object and the reference representation.

9. The method of claim 6, wherein to determine the object classification result for the alleged object comprises:
 recognizing that the alleged object identifies one from a plurality of image objects based on comparing (1) the representation of the alleged object with (2) respective representations of the plurality of image objects.

10. The method of claim 6, wherein to determine the object classification result for the alleged object comprises:
 verifying that the alleged object and another image object identify a same object based on comparing (1) the representation of the alleged object with (2) a representation of the other image object.

11. The method of claim 6, further comprises:
 determining a template representation for a second alleged object based on representations of gallery images within a set of query images for the second alleged object;
 determining respective template representations for a plurality of image objects based on representations of gallery images within respective sets of gallery images for the image objects; and
 recognizing that the second alleged object identifies one from the plurality of image objects based on comparing (1) the template representation of the second alleged object with (2) the respective template representations of the plurality of image objects,
 wherein the respective sets of gallery images for the image objects include gallery images selected by the computer vision system from one or more larger sets of gallery images based on quality scores of gallery images within the one or more larger sets.

12. The method of claim 6, further comprises:
 determining a template representation for a second alleged object based on representations of gallery images within a set of query images for the second alleged object;
 determining another template representation for another image object based on representations of gallery images within a set of query images for the other image object; and
 verifying that the second alleged object and the other image object identify a same object based on comparing (1) the template representation of the second alleged object with (2) the template representation of the other image object.

13. The method of claim 6, further comprising:
comparing, by the computer vision system, a second representation of a second alleged object from a second image with the reference representation for the image objects including characteristics capable to cause a false positive classification result according to the object classifier to determine a quality score for the second alleged object based, at least in part, on a result of the comparison; and
responsive to determining that the quality score for the second alleged object does not satisfy the filter criteria for the object classifier, discarding the representation for the object classifier to determine an object classification result for the alleged object.

14. The method of claim 6, wherein the representation is a feature vector, wherein the reference representation is a reference feature vector, and wherein the reference feature vector is determined based on an average of feature vectors representing the image objects including characteristics capable to cause a false positive classification result according to the object classifier.

15. The method of claim 6, wherein the representation is a feature vector, wherein the reference representation is a reference feature vector, and wherein the feature vector and the reference feature vector are determined using a convolutional neural network.

16. The method of claim 6, wherein the filter criteria is specified for the object classifier according to a received request.

17. The method of claim 6, wherein the computer vision system is implemented as part of a computer vision service offered by a provider network, and wherein the representation of the alleged object is received via a network-based interface for the computer vision service.

18. One or more non-transitory, computer-readable storage media, storing program instructions that when executed on or across one or more computing devices cause the one or more computing devices to implement:
generating a representation of an alleged object from an image;
determining a quality score for the alleged object according to a comparison of the representation of the alleged object with a reference representation for one or more image objects that include one or more characteristics capable to cause a false positive classification result of the one or more image objects according to an object classifier; and
responsive to determining that the quality score for the alleged object satisfies one or more filter criteria for the object classifier, providing the representation to the object classifier to determine an object classification result for the alleged object.

19. The one or more non-transitory computer readable media of claim 18, wherein the representation is a feature vector, wherein the reference representation is a reference feature vector, and wherein the object classifier performs face recognition that identifies one from a plurality of individuals based on comparing the feature vector for the alleged object to respective feature vectors of the plurality of individuals generated from image data.

20. The one or more non-transitory computer readable media of claim 18, wherein the representation is a feature vector, wherein the reference representation is a reference feature vector, and wherein the comparison that determines the quality score is based on a cosine similarity between the feature vector and the reference feature vector, and wherein the reference feature vector is determined based on an average of respective feature vectors of the image objects including characteristics capable to cause a false positive classification result according to the object classifier.

* * * * *